United States Patent [19]

Brearley

[11] 4,233,599

[45] Nov. 11, 1980

[54] MALFUNCTION DETECTOR FOR SPEED SENSORS

[75] Inventor: Malcolm Brearley, Solihull, England

[73] Assignee: Girling Limited, Birmingham, England

[21] Appl. No.: 16,351

[22] Filed: Feb. 28, 1979

[30] Foreign Application Priority Data

Feb. 28, 1978 [GB] United Kingdom .............. 07794/78

[51] Int. Cl.$^3$ .......................... G08B 21/00; B60Q 1/00
[52] U.S. Cl. .................................. 340/679; 188/181 C; 303/92; 340/62; 340/672
[58] Field of Search .................. 340/679, 671, 670, 62; 188/181 R, 181 C; 303/92; 324/166

[56] References Cited

U.S. PATENT DOCUMENTS

| | | | |
|---|---|---|---|
| 3,701,139 | 10/1972 | Creuz ................................... | 340/679 |
| 3,841,712 | 10/1974 | Syria .................................... | 340/671 |
| 3,920,280 | 11/1975 | Luhdorff et al. ..................... | 340/62 |
| 4,013,324 | 3/1977 | Quon .................................... | 303/92 |
| 4,031,509 | 6/1977 | Matulevich ........................... | 340/62 |
| 4,092,853 | 6/1978 | Schneider et al. .................... | 303/92 |
| 4,113,321 | 9/1978 | Bleckman ............................. | 303/92 |
| 4,157,850 | 6/1979 | Marouby .......................... | 188/181 C |
| 4,171,030 | 10/1979 | Ruhl ..................................... | 340/62 |

Primary Examiner—Glen R. Swann, III
Attorney, Agent, or Firm—Scrivener, Parker, Scrivener and Clarke

[57] ABSTRACT

A system is disclosed for monitoring operation of a speed sensor which produces a pulse signal with a repetition frequency related to the speed being sensed. An analogue speed signal is derived from a pulse signal having a repetition frequency related to the sensed speed and is fed to an integrator which, under the control of the pulse signal, performs successive separate integrating operations on the analogue speed signal in the periods between successive pulses, and a comparator compares the integrated sum thus produced with a reference value corresponding to a limit for normal generation of pulses, to produce a warning signal if the integrated sum exceeds the reference value. The system may include a timer to respond to successive warning signals and produce a malfunction signal if they occur with less than a predetermined time interval between them. The system may also include a differentiator to differentiate the sensor pulse signal so as to obtain a spiked reset pulse at each edge of each sensor pulse, these reset pulses then being used to control the integrator. The integrating operations may be performed during the mark and the space portions of each pulse cycle.

14 Claims, 3 Drawing Figures

MALFUNCTION DETECTOR FOR SPEED SENSORS

BACKGROUND OF THE INVENTION

This invention relates to speed sensors of the kind that produce a pulse signal with a repetition frequency related to the speed being sensed. In particular, the invention relates to the use of speed sensors of the aforesaid kind in anti-lock brake control systems for vehicles with braked wheels in which the sensors are used to sense wheel speed.

Anti-lock brake control systems detect impending wheel lock conditions by sensing the corresponding fall in wheel speed and respond by releasing the brakes so that wheel speed can recover. In high performance systems, the wheel speed sensors employed respond to a rapid fall in wheel speed such as occurs during two or three pulses of the sensor pulse signal. However, this high sensitivity can then lead to the dangerous situation in which cyclic malfunctions in the sensor are interpreted as a fall in wheel speed and the brakes are released. For example, if a sensor has a rotor with a series of teeth that produce the pulses, and one or more teeth is distorted, broken or missing due to damage caused by the intrusion of a foreign body or excessive rotor run out or bearing wear, one or more pulses will be missing per revolution thereby producing a sensor signal with cyclic variations that can cause repeated brake release, possibly leading to a complete loss of brake pressure.

SUMMARY OF THE INVENTION

An object of the present invention is to provide a method of, and means for, monitoring a speed sensor pulse signal so as to detect irregularities resulting from sensor malfunction rather than true speed variations.

The invention is based on an appreciation of the fact that the period of the pulse signal varies inversely with the wheel speed or pulse repetition frequency so that integrating the latter over the period between successive pulses will produce a constant sum irrespective of variations in the wheel speed. If, however, a pulse is missing, the integrating period between the pulses on either side will increase and the integrated sum will increase above said constant value and can be detected to signal a malfunction.

The invention therefore consists in providing integrating means and comparison means, feeding to the integrating means an analogue speed signal derived from the speed sensor pulse signal, controlling the integrating means with said pulse signal so that it performs successive separate integrating operations on said speed signal in the periods between successive pulses, and comparing the integrated sum produced in the integrating means during said successive integrating operations with a reference sum corresponding to a limit for normal generation of pulses so that a warning signal is produced if said integrated sum exceeds said reference.

If the sensor is suffering from a cyclic malfunction, as described above in connection with an anti-lock brake control system, then warning signals will be produced in successive sensor cycles, and timer means is provided that responds to these signals and produces a malfunction signal only if they occur over a predetermined period of time.

The integrating means may be controlled so as to perform said successive integrating operations by differentiating the sensor pulse signal so as to obtain a spiked pulse at each edge of each sensor pulse, these spiked pulses then being used as reset pulses in the integrating means. Furthermore, if the mark:space ratio of the sensor pulse signal is 1:1, then integrating operations may be performed during both the mark and space portions of each pulse cycle instead of only the space portion corresponding to the period between successive pulses.

BRIEF DESCRIPTION OF THE DRAWINGS

The invention will now be described by way of example with reference to the accompanying drawings, in which.

DESCRIPTION OF THE PREFERRED EMBODIMENT

Figure 1:
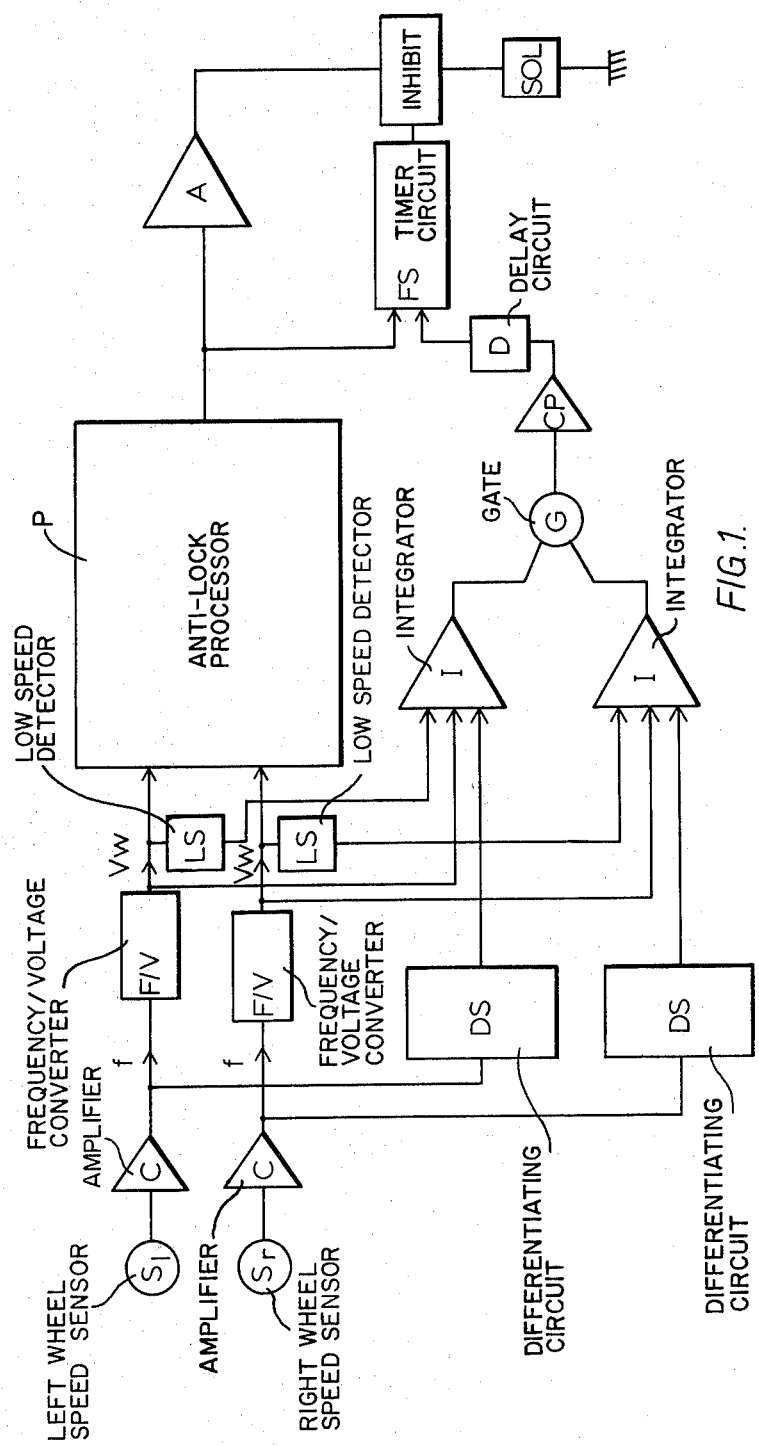
FIG. 1 is a schematic diagram of an anti-lock brake control system including wheel speed sensors and monitoring means according to the invention so as to detect cyclic sensor malfunctions and inhibit brake release when they occur.

The illustrated anti-lock brake control system comprises two wheel speed sensors $S_l$ and $S_r$, each being of the type having a rotor formed with a series of teeth around its periphery producing a square pulse signal f (FIG. 3i) with a mark/space ratio of 1:1. The pulse signal f from each sensor S is amplified in an amplifier C and converted into an analogue speed signal $V_W$ in a frequency/voltage converter F/V before being fed to an anti-lock processor P. The processor P analyses the wheel speed signals $V_W$ to detect incipient wheel lock conditions and to produce a suitable brake release signal that energises a solenoid SOL to effect brake release.

The square pulse signal f from each sensor is also fed to a respective differentiating circuit DS that produces a spiked pulse at each transition of the input pulses, thereby producing a train of reset pulses (FIG. 3ii) at twice the frequency of the pulse signal f. These reset pulses are fed to a respective integrator circuit I to control successive integrating operations between the pulses. The signal that is integrated is the analogue speed signal Vw from the F/V converter that is fed by the same pulse signal f that produces the reset pulses. As a result of the integrating operation, the integrator I produces a steadily increasing output voltage $V_I$ (FIG. 3iii) in the form of a ramp before being reset to zero by the next reset pulse, the integrator thereby producing a saw-tooth output signal under normal running conditions. If the sensed speed falls, the pulse cycle period T (FIG. 3i) increases and gives longer integration times, but, provided the fall in speed is not instantaneous, it is followed by the analogue speed signal Vw so that the amplitude of the ramp output of the integrator remains substantially constant. However, interruptions in the sensor pulse signal such as caused by a missing pulse, produces a longer integration period that is not accompanied by a fall in the analogue speed signal and thus the output $V_I$ of the integrator rises. In the case of a missing pulse, (see FIG. 3) two reset pulses are lost and thus the integrations period is suddenly tripled and the amplitude of the ramp output is correspondingly tripled.

A comparator circuit CP receives the outputs from both integrators I via a gate G and is set to be triggered by an output in excess of a predetermined threshold $V_{REF}$ (FIG. 3iii) corresponding to the limit of normal running conditions. Thus, a missing pulse causes the comparator CP to be triggered whilst the threshold is exceeded and to produce an output pulse $VC1_O$ (FIG. 3iv) that in turn produces an extended pulse in a delay circuit D. The output of the delay circuit is connected to a fail-safe timer circuit FS that is adapted to produce a malfunction signal to inhibit via an inhibit circuit further brake release only if it is held operated for a predetermined time via the delay circuit D by successive output pulses from the comparator CP. Thus the system only responds to sensor malfunctions that occur cyclically for a minimum qualifying time set by the fail-safe timer. The fail-safe timer may be the normal fail-safe timer provided in all anti-lock brake control systems to over-ride any brake release signal that lasts for more than a predetermined time indicative of abnormal operation.

At low speeds, for example, speeds below 8 to 10 m.p.h., the output sum of the integrator I may vary due to F/V converter offset and integrator drift, resulting in the production of spurious malfunction signals. In order to prevent this from occurring, operation of the integrator I is inhibited below a predetermined low speed by providing a low speed detector LS that analyses the analogue speed signal $V_W$ and responds to speeds below said predetermined low speed by applying a pulse $V_{LS}$ to the integrator to hold it in the reset state.

Figure 2:
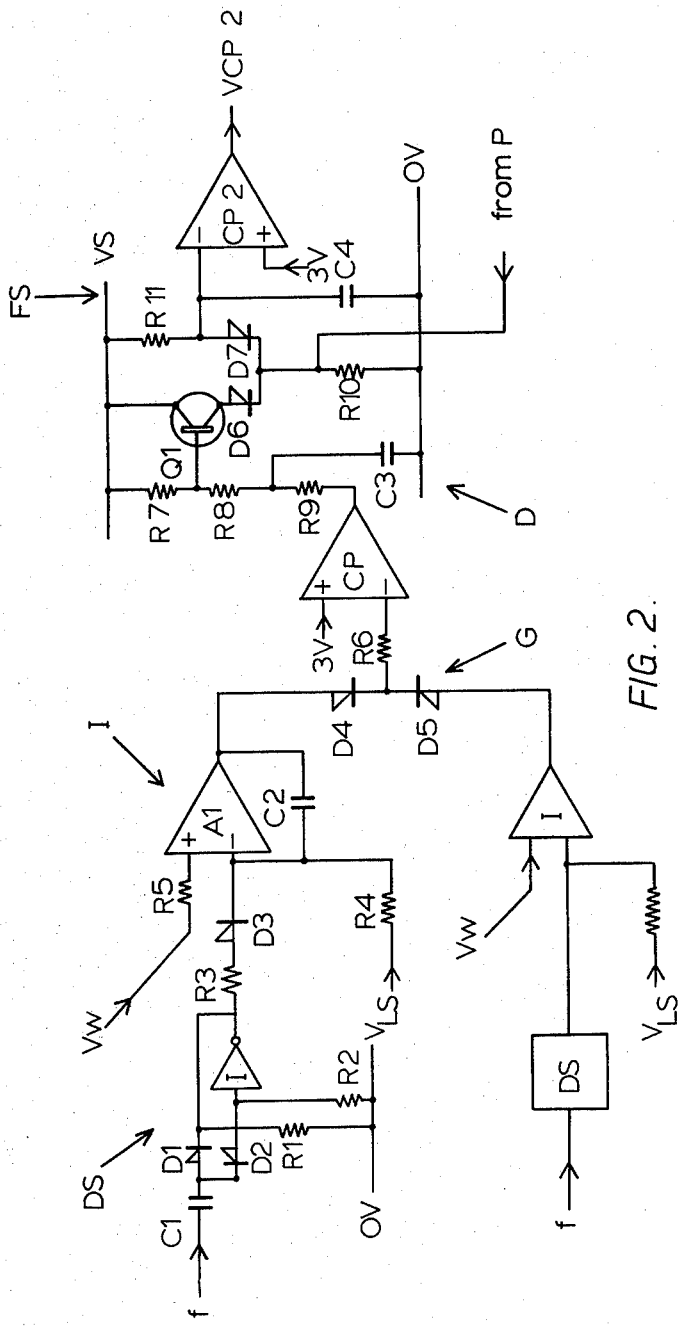
FIG. 2 is a circuit diagram of the monitoring means in FIG. 1.

An example of suitable circuitry for the differentiating circuit DS, the integrator I, the gate G, the comparator CP, the delay circuit D and the fail-safe timer FS is shown in FIG. 2.

The differentiating circuit DS comprises a capacitor C1 and two resistors R1 and R2 with two diodes D1 and D2 to isolate the positive and negative spiked pulses produced by the transitions at the edges of each sensor pulse. An inverter I inverts the negative spiked pulses which are then combined with the positive spiked pulses to produce the reset pulse train that is applied to the integrator I via resistor R3 and diode D3.

The integrator I comprises the operational amplifier A1 having a negative input terminal receiving the reset pulse train and the low speed signal from the low speed detector LS, and a positive input terminal receiving the analogue speed signal $V_W$. The reset pulses and speed signal produce an output signal with a saw-tooth form as described above. If all of the sensor pulses fail, the F/V converter output falls to zero and the integrator A1 is biassed so that its output voltage falls to the reset zero level.

The gate G comprises the diodes D4, D5, each in the output connection from a respective integrator I to the comparator CP so that each integrator can trigger the same comparator CP.

Figure 3:
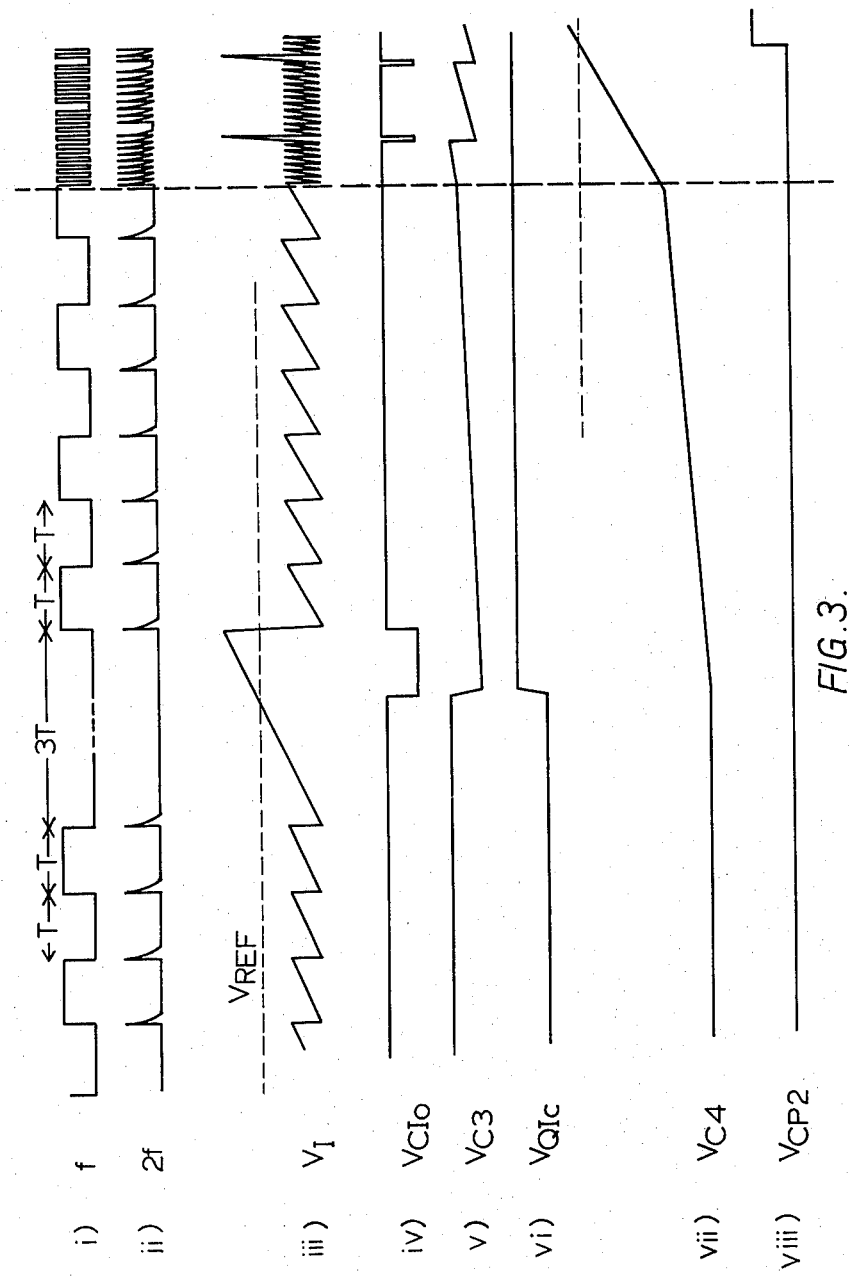
FIG. 3 shows the signals generated in the system of FIGS. 1 and 2.

The delay circuit D comprises a capacitor C3 that is discharged rapidly via resistor R9 when the comparator CP is triggered, and that subsequently charges at a slow rate via resistor R8 when the comparator CP resets (FIG. 3v). While comparator CP is triggered and afterwards while capacitor C3 is re-charged, a transistor Q1 is held in a conducting state and applies an output signal $VQ1_c$ (FIG. 3vi) via diodes D6, D7 and resistor R10 to a timer circuit FS comprising resistor R11 and capacitor C4, thereby causing the capacitor C4 to be charged (FIG. 3vii). Thus, triggering comparator CP produces an extended output pulse $VQ1_c$ from transistor Q1 that operates the timer circuit FS for a predetermined time set by capacitor C3 and resistor R8. This time is not sufficiently long for the capacitor C4 to be charged to a high enough level to trigger a comparator CP2. However, it is long enough to overlap a similar output pulse $VQ1_c$ produced by triggering of the comparator CP as a result of detection of a malfunction in the next cycle of the wheel speed sensor. Thus, a cyclically occurring malfunction will charge the capacitor C4 long enough to trigger comparator CP2 and produce a malfunction signal $V_{CP2}$ (FIG. 3 viii). That side of FIG. 3 to the left of the broken line shows the waveforms produced as a result of the comparator CP being triggered once. The waveforms to the right of the broken line are on a reduced scale and show successive cyclic operations of the comparator CP leading to triggering of comparator CP2.

Typically, each individual output pulse from transistor Q1 lasts for 600 mS so that the circuit can produce a malfunction signal $V_{CP2}$ after a qualifying period of 3 seconds as a result of a single missing speed sensor pulse at all wheel speeds greater than 100 r.p.m.

I claim:

1. A method of monitoring operation of a speed sensor that generates a pulse signal with a repetition frequency related to the speed being sensed, the method comprising the steps of deriving an analogue speed signal from said pulse signal, integrating said analogue speed signal in the periods between successive pulses of said pulse signal so as to obtain a separate integrated sum for each period, and comparing the integrated sum obtained for each period with a reference value corresponding to a limit for normal generation of pulses so that a warning signal is produced if said integrated sum exceeds said reference.

2. A method as claimed in claim 1 in which said pulse signal has a mark/space ratio of substantially 1:1 and in which said analogue speed signal is integrated in successive mark and space portions so as to obtain a separate integrated sum for each.

3. A method as claimed in claim 2 in which said pulse signal is differentiated so that the leading and lagging edge of each pulse produces a reset pulse that controls said successive integrating operations.

4. A method as claimed in claim 1 in which said speed sensor operates in a cyclic manner to generate said pulse signal, and in which the production of warning signals in two or more successive cycles is used to trigger a malfunction signal.

5. A method as claimed in claim 4 in which the warning signal is of a predetermined duration equal to the period of a cycle of operation of said sensor so that successive warning signals overlap and control generation of a malfunction signal.

6. A method as claimed in claim 1 in which the speed sensor senses the speed of a wheel in a vehicle anti-lock brake control system, the warning signal being used to over-ride the anti-lock brake control system so as to ensure normal braking.

7. A method as claimed in claim 6 in which if the sensor senses wheel speeds below a predetermined level, generation of a warning signal is inhibited.

8. Means for monitoring operation of a speed sensor that generates a pulse signal with a repetition frequency related to the speed being sensed, the means comprising a convertor for deriving an analogue speed signal from said pulse signal, integrating means for integrating said analogue speed signal in the periods between successive pulses of said pulse signal so as to obtain a separate integrated sum for each period, and comparison means for comparing the integrated sum obtained from said integrating means for each period with a reference value corresponding to a limit for normal generation of pulses so that a warning signal is produced if said integrated sum exceeds said reference.

9. Means as claimed in claim 8 in which said integrating means integrates said analogue speed signal in successive mark and space portions of said pulse signal so as to obtain a separate integrated sum for each.

10. Means as claimed in claim 9 including differentiating means to differentiate said pulse signal so that the leading and lagging edge of each pulse produces a reset pulse that passes to said integrating means to end one integrating operation and initiate the next integrating operation.

11. Means as claimed in claim 8 which includes a timer that responds to said warning signal so that it produces a malfunction signal if successive warning signals are produced with less than a predetermined time interval between commencement of each.

12. Means as claimed in claim 11 in which the comparison means produces said warning signal of a predetermined duration equal to said time interval, and in which the timer produces said malfunction signal if successive warning signals are received without a spacing therebetween.

13. Means as claimed in claim 8 in combination with a vehicle anti-lock brake control system including a speed sensor to sense the speed of a braked wheel of the vehicle, the sensor producing a pulse signal with a repetition frequency corresponding to the speed of the wheel and said monitoring means monitoring said operation of said sensor and producing said warning signal to over-ride the anti-lock brake control system to ensure normal braking when an expected pulse is missing from said pulse signal.

14. Means as claimed in claim 13 which includes detection means that responds to wheel speeds below a predetermined level and operates to inhibit generation of a warning signal under low speed conditions.

* * * * *